United States Patent
Akkarakaran et al.

(10) Patent No.: US 8,396,438 B2
(45) Date of Patent: Mar. 12, 2013

(54) ENHANCED INTERFERENCE NULLING EQUALIZATION

(75) Inventors: Sony J. Akkarakaran, Poway, CA (US); Alexei Y. Gorokhov, San Diego, CA (US); Dhananjay A. Gore, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 731 days.

(21) Appl. No.: 12/491,122

(22) Filed: Jun. 24, 2009

(65) Prior Publication Data

US 2010/0330946 A1     Dec. 30, 2010

(51) Int. Cl.
H04B 1/06     (2006.01)
H04B 7/00     (2006.01)

(52) U.S. Cl. .................. 455/278.1; 455/273; 370/208

(58) Field of Classification Search ............ 455/63.1, 455/66.1, 67.11, 101, 296
See application file for complete search history.

(56) References Cited

U.S. PATENT DOCUMENTS

| | | | | |
|---|---|---|---|---|
| 6,128,355 A | * | 10/2000 | Backman et al. ............ | 375/347 |
| 7,539,273 B2 | * | 5/2009 | Struckman ................. | 375/341 |
| 7,872,963 B2 | * | 1/2011 | Choi et al. ................ | 370/208 |
| 2005/0101279 A1 | | 5/2005 | Lee et al. | |
| 2006/0291596 A1 | * | 12/2006 | Piirainen .................... | 375/346 |
| 2008/0014876 A1 | * | 1/2008 | Heikkila et al. ........... | 455/114.2 |

FOREIGN PATENT DOCUMENTS

| | | |
|---|---|---|
| EP | 1530299 | 5/2005 |
| WO | WO2007003680 | 1/2007 |

OTHER PUBLICATIONS

Anonymous: "Physical Layer for Ultra Mobile Broadband (UMB) Air Interface Specification", 3GPP2-Drafts, 2500 Wilson Boulevard, Suite 300, Arlington, Virginia 22201, USA, Aug. 31, 2007, XP040480360, Chapter 4.1.3.4.7; pp. 4-41.
International Search Report—PCT/US2010/039621—International Search Authority, European Patent Office, Oct. 22, 2010.
International Search Report and Written Opinion—PCT/US2010/03962, International Search Authority—European Patent Office—Mar. 16, 2011.

* cited by examiner

Primary Examiner — Matthew Anderson
Assistant Examiner — Fatuma Sherif
(74) Attorney, Agent, or Firm — Stanton Braden

(57) ABSTRACT

Systems and methodologies are described that facilitate combining received signals from multiple receive antennas in a wireless communication environment. The received signals from the multiple receive antennas can be weighted utilizing an adaptive combination of maximal ratio combining (MRC) and interference nulling. The combination of MRC and interference nulling can be controlled based upon one or more configurable parameters. For instance, a covariance matrix can be modified to include the one or more configurable parameters, and the modified covariance matrix can be utilized in connection with interference nulling. Further, respective values for the one or more configurable parameters can be selected as a function of at least one input (e.g., measured interference-over-thermal (IoT) value, received loading level indicator, eigenvalue distribution of a covariance matrix, . . . ) related to noise correlation.

20 Claims, 10 Drawing Sheets

ENHANCED INTERFERENCE NULLING EQUALIZATION

BACKGROUND

1. Field

The following description relates generally to wireless communications, and more particularly to employing a merger of maximal ratio combining (MRC) and interference nulling to weight received signals from multiple receive antennas and combine the weighted, received signals in a wireless communication environment.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

A conventional wireless communication apparatus (e.g., base station, mobile device, . . . ) typically includes a receiver that receives signal(s) from, for instance, one or more receive antennas, and performs actions thereon (e.g. filters, amplifies, downconverts, . . . ) the received signal(s). Oftentimes, the receiver can obtain multiple signals from a plurality of receive antennas, and the multiple signals can be combined to realize diversity and power gains due to independent channel and noise processes on different receive paths. Conventional techniques for merging the multiple signals, however, typically yield different levels of performance gains relative to each other when noises in the receive paths are correlated as compared to when noises in the receive paths are uncorrelated.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with combining received signals from multiple receive antennas in a wireless communication environment. The received signals from the multiple receive antennas can be weighted utilizing an adaptive combination of maximal ratio combining (MRC) and interference nulling. The combination of MRC and interference nulling can be controlled based upon one or more configurable parameters. For instance, a covariance matrix can be modified to include the one or more configurable parameters, and the modified covariance matrix can be utilized in connection with interference nulling. Further, respective values for the one or more configurable parameters can be selected as a function of at least one input (e.g., measured interference-over-thermal (IoT) value, received loading level indicator, eigenvalue distribution of a covariance matrix, . . . ) related to noise correlation.

According to related aspects, a method is described herein. The method can include weighting signals from multiple receive antennas utilizing a combination of maximal ratio combining (MRC) and interference nulling. Further, the method can include merging the weighted signals to yield an output signal.

Another aspect relates to a wireless communications apparatus. The wireless communications apparatus can include at least one processor. The at least one processor can be configured to weight signals from multiple receive antennas utilizing a combination of maximal ratio combining (MRC) and interference nulling. Moreover, the at least one processor can be configured to merge the weighted signals to yield an output signal.

Yet another aspect relates to a wireless communications apparatus. The wireless communications apparatus can include means for weighting signals from multiple receive antennas utilizing a combination of maximal ratio combining (MRC) and interference nulling. Further, the wireless communications apparatus can include means for joining the weighted signals to yield an output signal.

Still another aspect relates to a computer program product that can comprise a computer-readable medium. The computer-readable medium can include code for causing at least one computer to weight signals from multiple receive antennas utilizing a combination of maximal ratio combining (MRC) and interference nulling. Further, the computer-readable medium can include code for causing at least one computer to merge the weighted signals to yield an output signal.

Yet another aspect relates to an apparatus that can include a weighting component that generates respective weights for signals obtained via multiple receive antennas and applies the respective weights to the signals to yield weighted signals, the weighting component leverages a combination of maximal ratio combining (MRC) and interference nulling. Moreover, the apparatus can include a merging component that yields an output signal via summing the weighted signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
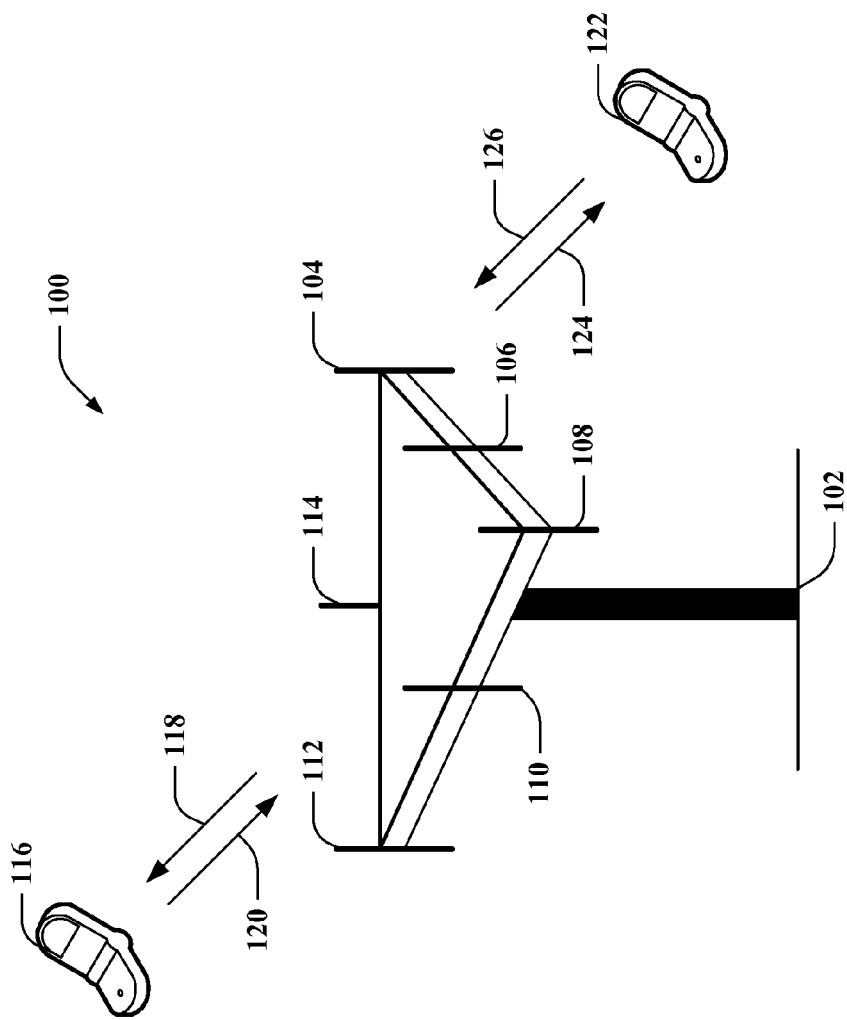
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g. processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 and mobile devices 116, 122 can each include a respective receiver (or respective plurality of receivers), which can combine signals from multiple receive antennas respectively associated therewith to realize diversity and power gains due to independent channel and noise processes on different receive paths. The receivers can utilize a combination of maximal ratio combining (MRC) and interference nulling to weight and merge the signals from the multiple receive antennas respectively associated therewith. Further, the combination of MRC and interference nulling can be tuned to yield advantages of both techniques by adapting to a structure of interference.

According to an example, interference nulling can leverage estimates of correlation between noises in different receive paths, and these estimates can be used while combining the signals in such paths. However, channel estimation error can yield inaccuracies in the estimates of correlation between noises; the inaccuracies of the estimates utilized for interference nulling can be particularly problematic when the noises are actually uncorrelated. Hence, interference nulling can perform better than MRC when noises are actually correlated, but worse than MRC when noises are actually uncorrelated. Receivers of wireless communication apparatuses (e.g. base station 102, mobile device 116, 122, . . . ) in system 100 can optimize performance for both correlated noise and uncorrelated noise scenarios by utilizing a combination of MRC and interference nulling. Further, the combination of MRC and interference nulling employed by the receivers of the wireless communication apparatuses can be tunable.

Figure 2:
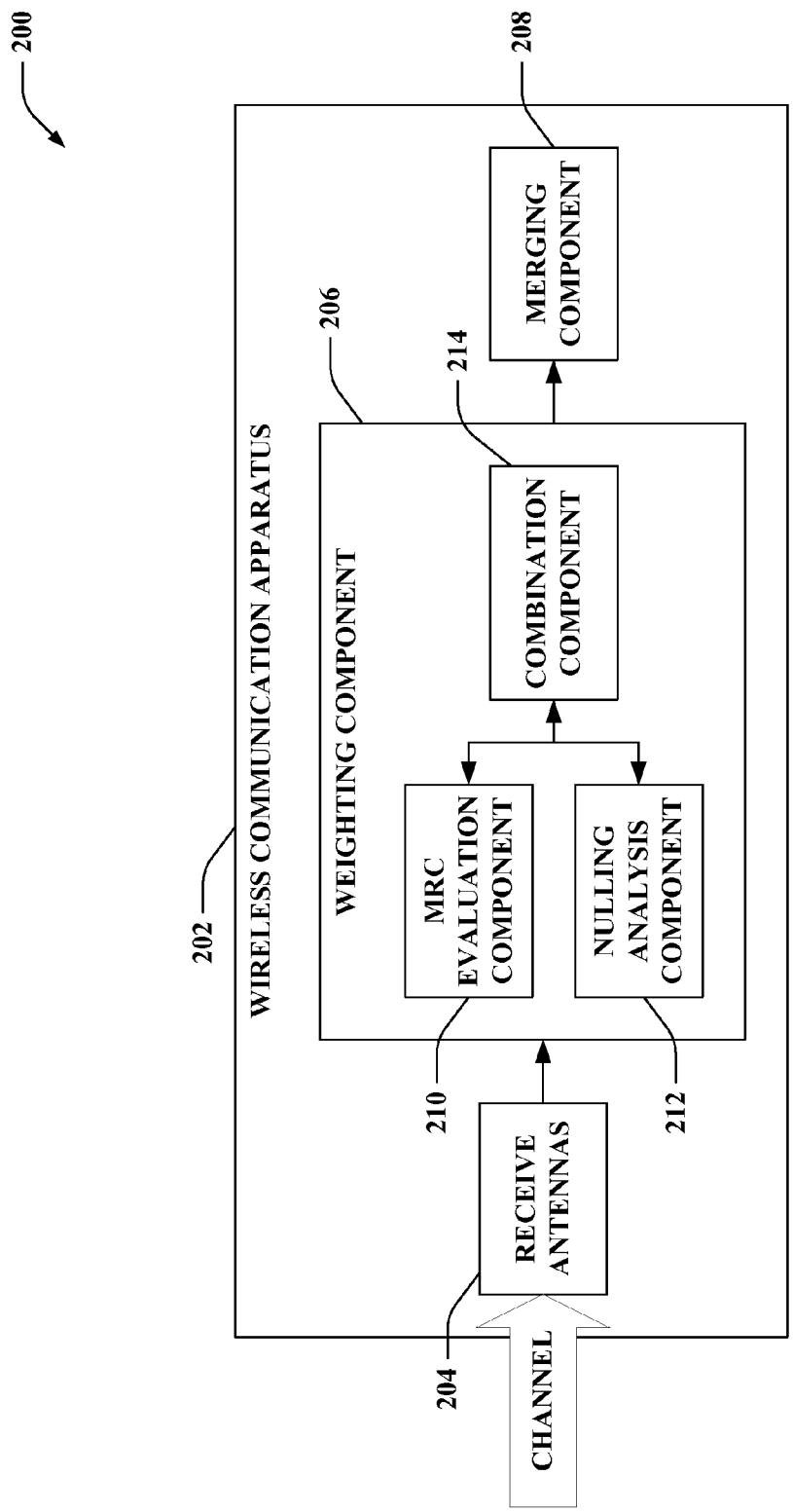
FIG. 2 is an illustration of an example system that combines signals from multiple receive antennas in a wireless communication environment.

Referring to FIG. 2, illustrated is a system 200 that combines signals from multiple receive antennas in a wireless communication environment. System 200 includes a wireless communication apparatus 202 that can transmit and/or receive information, signals, data, instructions, commands, bits, symbols, and the like. For instance, wireless communication apparatus 202 can be a base station (e.g., base station 102 of FIG. 1, . . . ), a mobile device (e.g., mobile device 116 of FIG. 1, mobile device 122 of FIG. 1, . . . ), or the like. Moreover, although not shown, it is contemplated that wireless communication apparatus 202 can communicate with substantially any number of disparate wireless communication apparatuses (e.g., base station(s), mobile device(s), . . . ).

Wireless communication apparatus 202 can include multiple receive antennas 204, a weighting component 206, and a merging component 208. Receive antennas 204 can each obtain signals transferred via a channel (e.g., transmitted from a disparate wireless communication apparatus (not shown), . . . ). Further, weighting component 206 can apply a respective weight yielded as described herein to each of the signals obtained by receive antennas 204. Weighting component 206 can leverage a combination of maximal ratio combining (MRC) and interference nulling to generate the respective weight for each of the signals. Moreover, the weighted signals can be joined together by merging component 208 to yield an output signal. For instance, merging component 208 can sum the weighted signals to generate the output signal.

According to an example, weighting component 206 and merging component 208 can be included in a receiver (not shown) of wireless communication apparatus 202. By way of a further example, receive antennas 204 can each be associated with a respective receiver, and each respective receiver can include a weighting component (e.g., substantially similar to weighting component 206, . . . ) and/or a merging component (e.g., substantially similar to merging component 208, . . . ). It is to be appreciated, however, that the claimed subject matter is not limited to the foregoing examples.

Weighting component 206 can further include an MRC evaluation component 210, a nulling analysis component 212, and a combination component 214. MRC evaluation component 210 can yield weights for received signals by employing MRC and nulling analysis component 212 can generate weights for received signals by utilizing interference nulling. MRC evaluation component 210 and nulling analysis component 212 can operate in conjunction under control of combination component 214. Thus, performance of MRC and interference nulling effectuated respectively by MRC evaluation component 210 and nulling analysis component 212 can be joined together by combination component 214.

Combination component 214 can manage behavior of weighting component 206 to vary smoothly between effectuating MRC (e.g., with MRC evaluation component 210, . . . ) and interference nulling (e.g., with nulling analysis component 212, . . . ). Further, combination component 214 can identify desired behavior and appropriately set control variable(s) to yield such desired behavior. Thus, combination component 214 can merge MRC and interference nulling to provide advantages commonly associated with each technique separately. Moreover, joining of MRC and interference nulling effectuated by combination component 214 can be tuned (e.g. configured, . . . ) to adapt to a structure of interference on the channel, thereby enabling performance of system 200 to be optimized. For example, MRC and interference nulling can be merged by combination component 214 as a function of correlation of noises on different paths obtained by receive antennas 204 transferred via the channel.

MRC evaluation component 210 can perform MRC by weighting an i-th path with a gain $w_i = h_i/\sigma_i^2$, where $h_i$ and $\sigma_i^2$ respectively represent channel strength and noise variance on the i-th path. The channel strength and noise variance on the i-th path can be estimated by MRC evaluation component 210 using pilots embedded within a transmitted waveform for this purpose. Thus, MRC evaluation component 210 can weight the signal received via the i-th path, $y_i$, by a corresponding weight for the i-th path, $w_i$ (e.g., yielding $w_i y_i$, . . . ) The estimation algorithm for MRC can work independently on each path. Further, MRC can be optimal when the channel and noise on the different paths are independent. However, in many wireless systems, a dominant noise source is often interference from another transmitter rather than thermal noise. This interference could be highly correlated across receive antennas 204. MRC evaluation component 210 typically does not take advantage of such correlation when performing MRC.

Nulling analysis component 212 can perform interference nulling, which can use a weight vector given by $(w_0\ w_1\ \ldots\ w_{N-1}) = (h_0\ h_1\ \ldots\ h_{N-1})R^{-1}$, where matrix R is an N×N matrix, where N is the number of receive antennas 204 and can be substantially any integer. The matrix R is a covariance matrix of the interference. Interference nulling can exploit cross-correlation between the interferences on the different receive antenna streams, which appear as off-diagonal entries of the matrix R. If there is no such correlation, the off-diagonal entries become zero, and the interference nulling technique can become substantially similar to the MRC technique, since the i-th entry of $R^{-1}$ is $1/\sigma_i^2$.

Assuming that the covariance matrix R can be perfectly estimated, interference nulling is the mean-square sense optimal solution that performs at least as well as MRC. However, R is estimated from pilots embedded within the transmitted waveform by nulling analysis component 212 and is typically unable to be perfectly estimated. The accuracy of the estimation can improve as a rate of the pilot transmissions is increased; however, increasing the rate of pilot transmissions decreases a data rate that can be carried in the same bandwidth, since channel resources are being moved from data traffic to pilot transmissions. Thus, pilot overhead is often kept sufficiently low, which causes non-trivial error in the process of estimating R. Accordingly, MRC can perform better than interference nulling in the case of uncorrelated noise since MRC can be the optimal solution, while weights yielded for interference nulling are no longer identical to weights generated for MRC since the off-diagonal terms in R are not exactly zero due to estimation errors. Thus, a tradeoff can exist where MRC can be preferable for uncorrelated noise, and interference nulling can be preferable for correlated noise. The aforementioned tradeoff between MRC and interference nulling can be managed by combination component 214.

Weighting component 206 can be controlled by combination component 214 so that behavior of weighting component 206 can be smoothly varied between that of MRC (e.g., yielded by MRC evaluation component 210, . . . ) and that of interference nulling (e.g., provided by nulling analysis component 212, . . . ). Moreover, combination component 214 can determine desired behavior for weighting component 206 and/or can appropriately set control variables to yield such behavior.

According to an example, combination component 214 can manage a mixture of MRC and interference nulling based on a single parameter, $\lambda$. Thus, when weighting component 206 is computing weights, $w_i$, the covariance matrix R can be replaced with a modified covariance matrix $R_{new}$. The modified covariance matrix $R_{new}$ can be defined as $R_{new} = (1-\lambda)R + \lambda D$, where D is a diagonal matrix whose diagonal is identical to that of R. Thus, $\lambda=0$ gives the interference nulling solution, $\lambda=1$ gives the MRC solution, and $\lambda$ can be varied in the range from 0 to 1 to provide a smooth tradeoff between interference nulling and MRC. Following the aforementioned example, as $\lambda$ is set closer to zero by combination component 214, then larger Signal to Noise Ratio (SNR) gains can result in a correlated noise scenario and larger SNR losses can also result in an uncorrelated noise situation. Thus, by tuning the $\lambda$ value, combination component 214 can enable operating at substantially any desired point in the aforementioned tradeoff. It is to be appreciated, however, that the claimed subject matter is not limited to the particular formula for $R_{new}$ described in the above example, and instead is intended to encompass substantially any manner of modifying the estimated R matrix by inserting substantially any controllable parameter(s), which can be managed by combination component 214.

Pursuant to another example, combination component 214 can control a set of λ parameters rather than a single λ parameter. Following this example, each λ parameter in the set can be used to manage a corresponding subset of entries of the R matrix. The claimed subject matter, yet, is not limited to such example.

In accordance with yet another example, R can be diagonalized. Thus, R can be factorized into the form $R=U\Delta U^T$, where U is a unitary matrix, $\Delta$ is a diagonal matrix, and $U^T$ is a transpose of the unitary matrix U. Further, λ parameters can be used (e.g., by combination component 214, ...) to modify diagonal entries of $\Delta$ instead of modifying entries of R directly. Again, many λ parameters can be utilized, and each of the λ parameters can control modification of different subsets of the diagonal entries of $\Delta$. However, it is to be appreciated that the claimed subject matter is not limited to the foregoing example.

Figure 3:
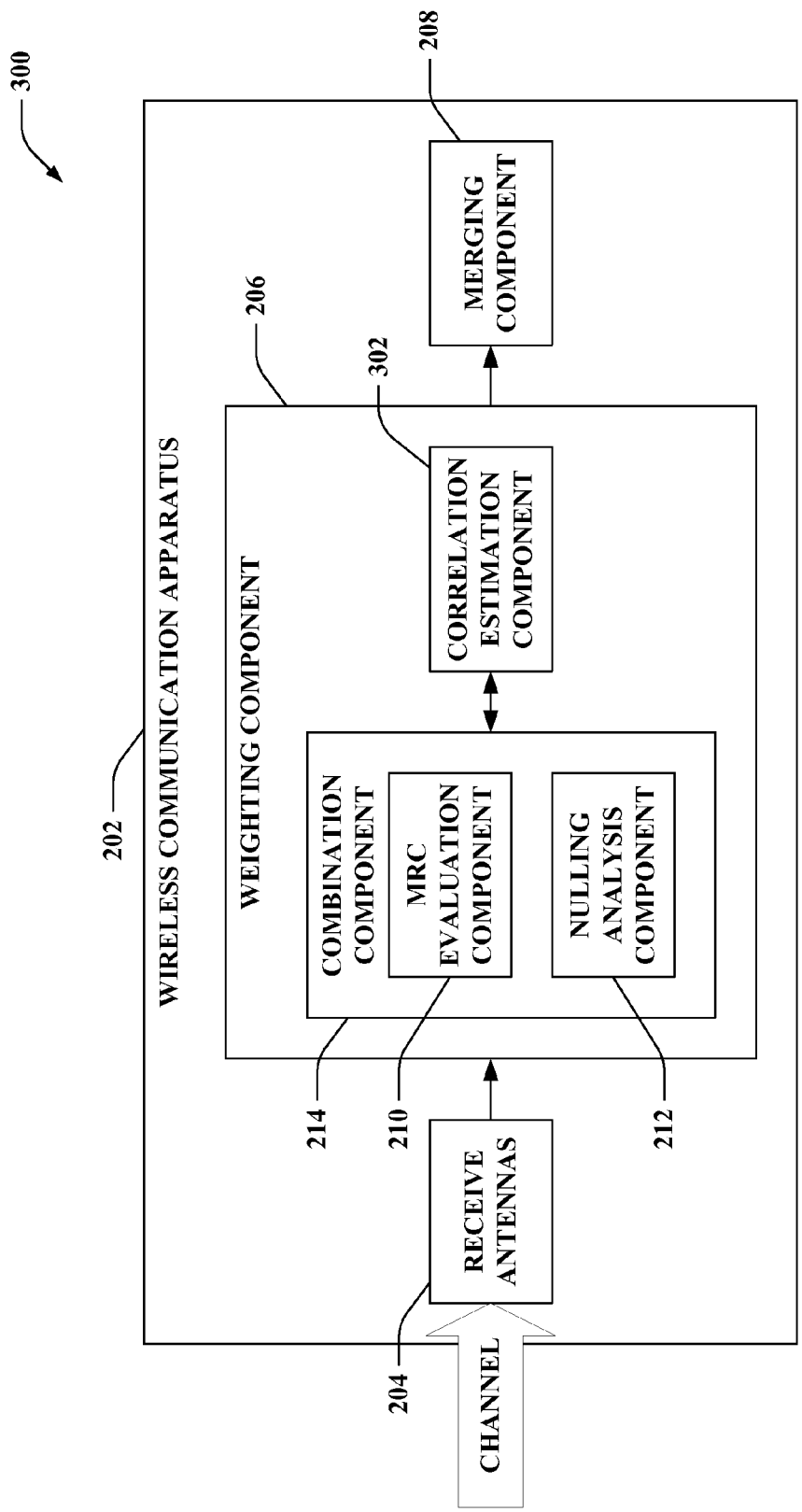
FIG. 3 is an illustration of an example system that selects a value of a parameter utilized to control generation of weights employed for combining signals from multiple receive antennas in a wireless communication environment.

Now turning to FIG. 3, illustrated is a system 300 that selects a value of a parameter utilized to control generation of weights employed for combining signals from multiple receive antennas 204 in a wireless communication environment. System 300 includes wireless communication apparatus 202 (e.g. base station, mobile device, ...). Wireless communication apparatus 202 can include receive antennas 204, weighting component 206, and merging component 208 as described herein. Weighting component 206 can include combination component 214, which can leverage a tunable combination of MRC and interference nulling. For instance, as depicted, weighting component 206 can include MRC evaluation component 210 and nulling analysis component 212. Alternatively, MRC evaluation component 210 and/or nulling analysis component 212 can be separate from combination component 214. Combination component 214 can employ a parameter (or a plurality of parameters) (e.g., λ, ...) to control the merger of MRC operation and interference nulling operation.

Moreover, weighting component 206 can include a correlation estimation component 302 that can evaluate one or more inputs related to noise correlation. As such, correlation estimation component 302 can approximate actual noise correlation between receive paths on the channel as a function of such inputs. Receive paths are receiver processing chains originating from different receive antennas. Based upon the approximated noise correlation, combination component 214 can choose a value for the parameter (or parameters) utilized for managing the combined operation of MRC evaluation component 210 and nulling analysis component 212. For example, combination component 214 can employ an equation, look-up table (e.g., retained in memory (not shown), ...), or the like to determine the value for the parameter (or parameters) based upon the approximated noise correlation yielded by correlation estimation component 302. According to an illustration, combination component 214 can select λ parameter(s) described herein to optimize system performance (e.g., λ closer to 1 can be chosen for uncorrelated noise scenarios and λ closer to 0 can be selected for correlated noise scenarios, ...).

Correlation estimation component 302 can analyze substantially any input (or combination of inputs) pertaining to noise correlation. For example, the input can be an interference-over-thermal (IoT) measurement yielded by wireless communication apparatus 202 (e.g. performed by correlation estimation component 302, a disparate monitoring component (not shown), ...), a loading level indicator obtained from a neighboring wireless communication apparatus (e.g., neighboring base station, ...), or an eigenvalue of a covariance matrix of the interference, R. Further, a combination of the inputs can be leveraged by correlation estimation component 302.

According to an example, an IoT value can be measured by correlation estimation component 302. Further, combination component 214 can utilize an equation, look-up table, etc. that maps the measured IoT value to a corresponding λ value. IoT can be measured by separately measuring a thermal noise level, as opposed to total interference (which includes both thermal noise and interference from other transmitters). Separate measurement of the thermal noise level can be effectuated when a transmission waveform includes periods (e.g., in time and frequency, ...) during which there is no transmission from any transmitter. Such periods can be used by a receiver (e.g., correlation estimation component 302, wireless communication apparatus 202 in general, ...) to measure the thermal level. Moreover, the thermal level may not change very rapidly; hence, the thermal noise level measurement can be averaged over a long time duration. Further, IoT can be measured separately for each channel resource unit being equalized, and the λ value can be set appropriately by combination component 214 for that unit. By employing the foregoing, weighting component 206 can behave closely to MRC (e.g., effectuated by MRC evaluation component 210, ...) in a thermal limited deployment (e.g., low IoT, ...), which can be optimal for such case. For instance, the λ value can be set to be closer to 1 by combination component 214 when a low IoT value is measured by correlation estimation component 302.

However, even when the IoT value measured by correlation estimation component 302 is large, it can be possible that the interference is uncorrelated (e.g., if the interference is caused by a number of independent sources in sum, ...). Thus, for instance, one dominant interferer can produce correlated interference, resulting in a large measured IoT value. By way of another illustration, several interferers can exist, and a large measured IoT value can be obtained by correlation estimation component 302. Thus, correlation estimation component 302 can estimate a number of interferers, and the λ value can be set by combination component 214 based at least in part upon the estimate of the number of interferers. For example, if wireless communication apparatus 202 is a base station, it can have knowledge of loading levels of its neighboring base station(s) (e.g., loading level indicators can be received from neighboring base station(s), ...). Accordingly, correlation estimation component 302 can estimate the number of interferers based upon the information related to loading levels of the neighboring base stations. For instance, if many neighboring base stations are heavily loaded, then the average number of interferers increases (e.g., as evaluated by correlation estimation component 302, ...); based thereupon, combination component 214 can move the λ value closer to 1. This type of algorithm can use averaged loading information from neighboring base stations, and can apply substantially similar adjustments to the λ values for channel resources of mobile devices transmitting to such base station (e.g., wireless communication apparatus 202, ...). Although the foregoing relates to utilizing IoT values measured at a base station and/or loading level indicators received at a base station, it is contemplated that such examples can be extended to wireless communication apparatus 202 being a mobile device; however, that claimed subject matter is not so limited.

According to another example, correlation estimation component 302 can examine a structure of the estimated covariance matrix R. In particular, correlation estimation component 302 can evaluate an eigenvalue distribution of R. If the noise is uncorrelated, R is diagonal, and the eigenvalues are its diagonal elements, which are the noise variances on each receive antenna 204. By appropriately scaling signals from receive antennas 204, the noise variances can be equalized, which can cause the eigenvalues of R to be equal in the case of uncorrelated noise. In contrast, if the noise is purely due to a single dominant interferer, then R can have rank 1, and thus, only one eigenvalue of R would be nonzero. In general, once the inputs have been scaled to equalize the noise variances on each receive antenna 204, the sharpness of the eigenvalue distribution of R can be used as an approximate measure of the number of interferers. Accordingly, if the eigenvalues of R are close to each other, it suggests uncorrelated interference, whereas if there is a single dominant eigenvalue of R, it suggests one dominant interferer. Thus, the choice of the $\lambda$ value yielded by combination component 214 can be dependent on this distribution. For example, correlation estimation component 302 can compute a ratio of a largest eigenvalue to a least eigenvalue, and then combination component 214 can use a lookup table or equation representing a decreasing function to map the ratio to a $\lambda$ value. Further, correlation estimation component 302 can employ one or more numerical methods to compute eigenvalues of R. For instance, such numerical methods can leverage Cholesky factorization of R, which can also be utilized for computing an inverse of R, which can be employed in connection with computing weights, $w_i$. By way of further example, correlation estimation component 302 can compute the largest and least eigenvalues by utilizing a power-method algorithm; however, the claimed subject matter is not so limited.

Figure 4:
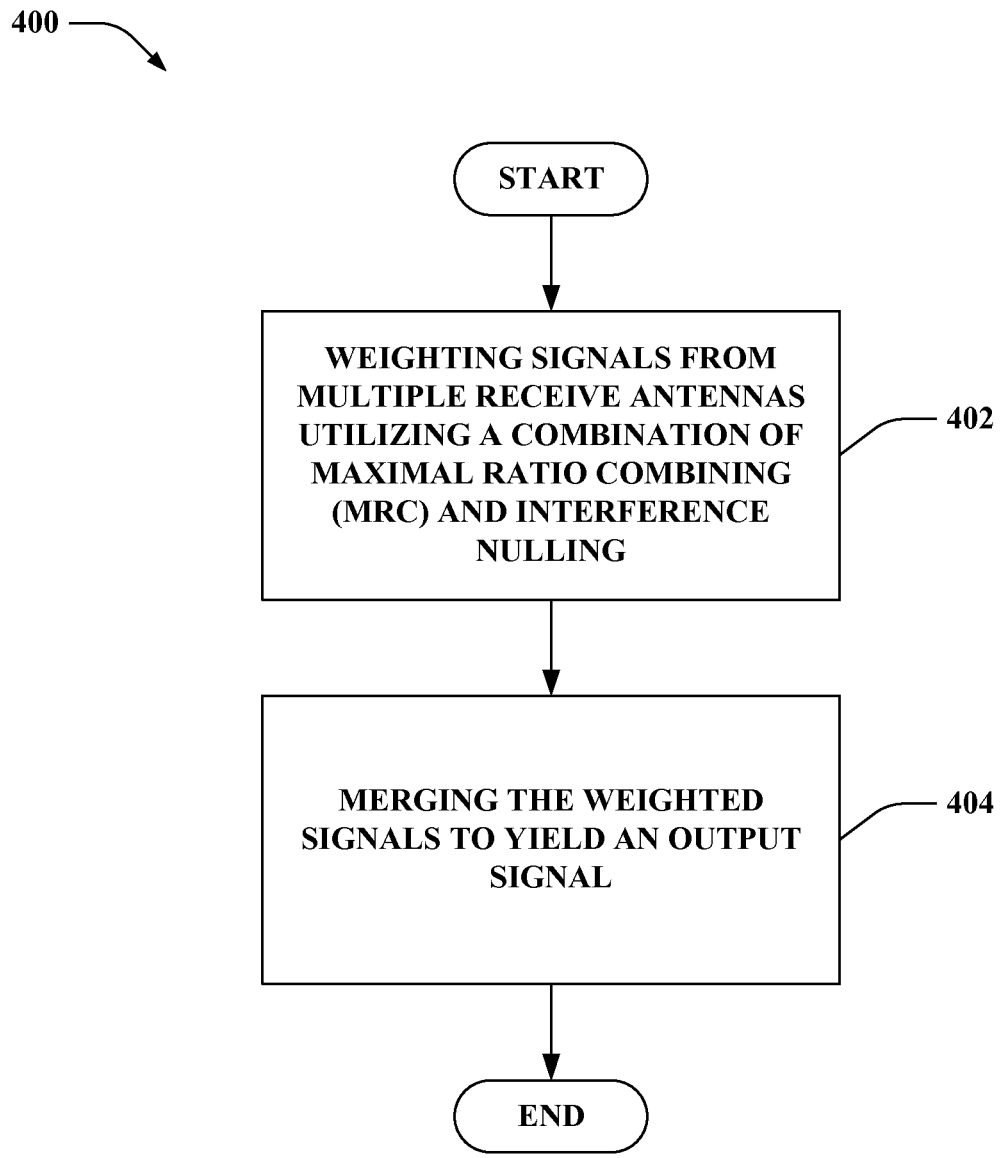
FIG. 4 is an illustration of an example methodology that facilitates joining signals from multiple receive antennas in a wireless communication environment.
Figure 5:
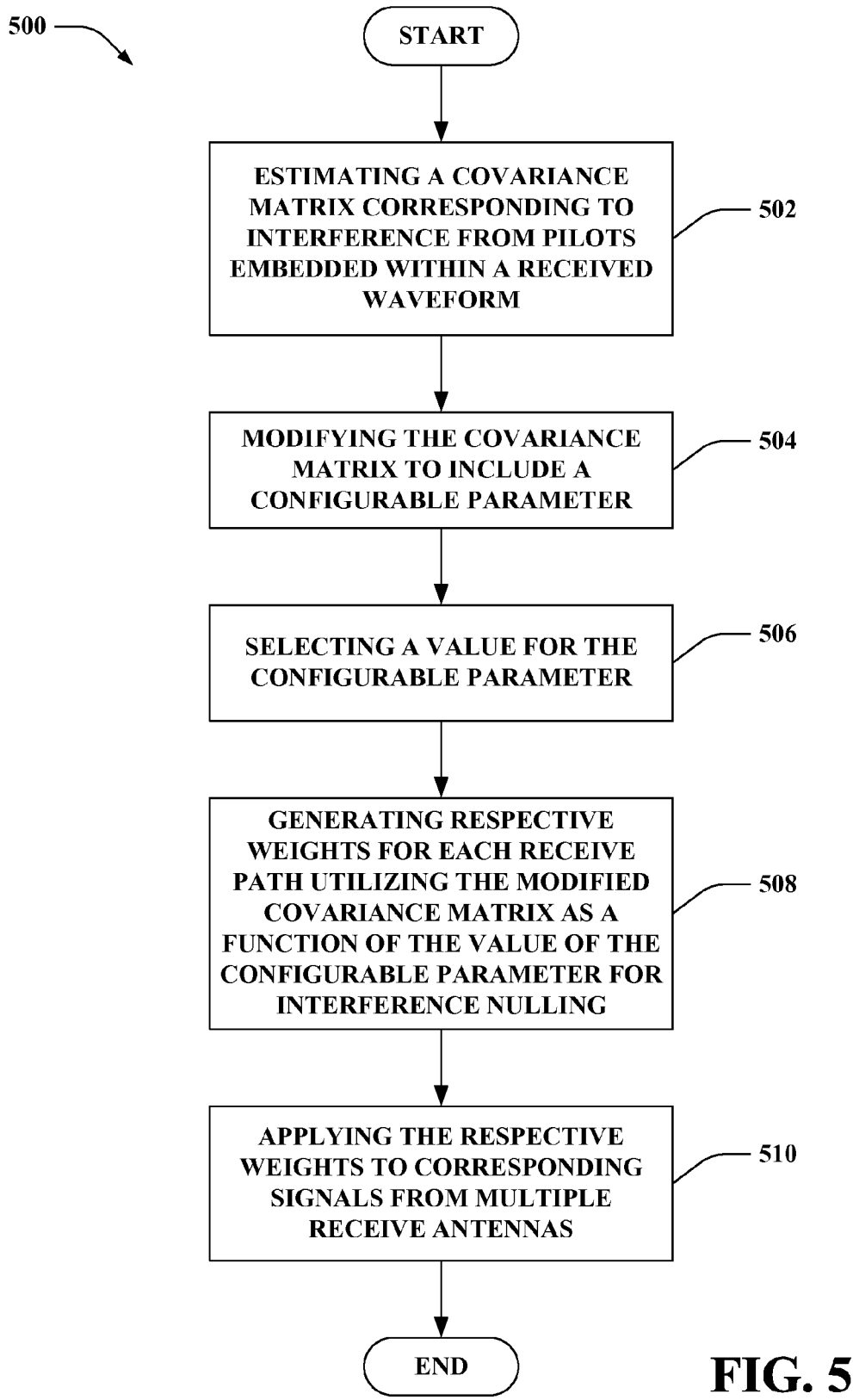
FIG. 5 is an illustration of an example methodology that facilitates adaptively weighting signals utilizing a combination of maximal ratio combining (MRC) and interference nulling in a wireless communication environment.
Figure 6:
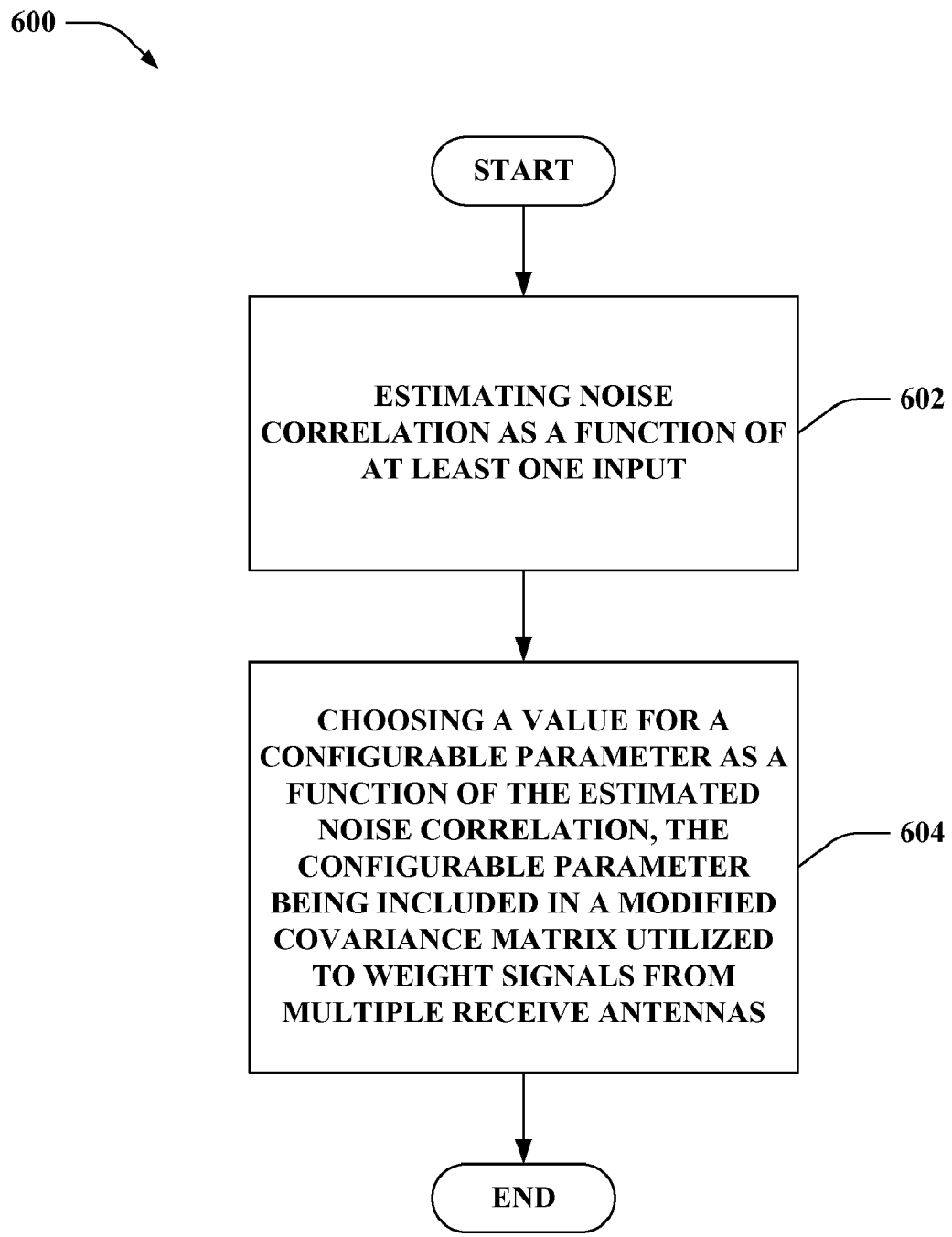
FIG. 6 is an illustration of an example methodology that facilitates selecting a value for a configurable parameter employed to control a combination of maximal ratio combining (MRC) and interference nulling in a wireless communication environment.

Referring to FIGS. 4-6, methodologies relating to adaptively weighting and merging signals from multiple receive antennas in a wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates joining signals from multiple receive antennas in a wireless communication environment. At 402, signals from multiple receive antennas can be weighted utilizing a combination of maximal ratio combining (MRC) and interference nulling. For instance, the combination of MRC and interference nulling can be controlled as a function of noise correlation. At 404, the weighted signals can be merged to yield an output signal. By way of example, the weighted signals from each receive antenna can be summed.

Now referring to FIG. 5, illustrated is a methodology 500 that facilitates adaptively weighting signals utilizing a combination of maximal ratio combining (MRC) and interference nulling in a wireless communication environment. At 502, a covariance matrix (e.g., R, . . . ) corresponding to interference can be estimated from pilots embedded within a received waveform. At 504, the covariance matrix can be modified to include a configurable parameter (e.g., tunable parameter, . . . ). For instance, the modification of the covariance matrix can be given by $s_{new}=(1-\lambda)s+\lambda d$, where s is an original value, $s_{new}$ is a modified value, $\lambda$ is the configurable parameter, and d is a desired value for a variable. According to an example, s can represent entries of the covariance matrix, $s_{new}$ can represent entries of the modified covariance matrix, and d can represent entries of a diagonal matrix with a diagonal that matches a diagonal of the covariance matrix. By way of another example, s can represent eigenvalues of the covariance matrix when the covariance matrix is factorized into diagonal form, $s_{new}$ can represent eigenvalues of the modified covariance matrix when the modified covariance matrix is factorized into diagonal form, and d can represent desired choices for eigenvalues (e.g., equal to a minimum of the original eigenvalues s, . . . ). Pursuant to a further example, it is contemplated that multiple configurable parameters can be included in the modified covariance matrix, and each of the multiple configurable parameters can be associated with a respective subset of variables to be modified; however, the claimed subject matter is not so limited. At 506, a value for the configurable parameter can be selected. Moreover, if multiple configurable parameters are included in the modified covariance matrix, then multiple values respectively corresponding to the multiple configurable parameters can be chosen. At 508, respective weights for each receive path can be generated utilizing the modified covariance matrix as a function of the value of the configurable parameter (or values of the configurable parameters) for interference nulling. A receive path is a particular receiver processing chain originating from a given receive antenna. At 510, the respective weights can be applied to corresponding signals from multiple receive antennas.

Referring to FIG. 6, illustrated is a methodology 600 that facilitates selecting a value for a configurable parameter employed to control a combination of maximal ratio combining (MRC) and interference nulling in a wireless communication environment. At 602, noise correlation can be estimated as a function of at least one input. For instance, the input can be a measured interference-over-thermal (IoT) value. By way of another example, the input can be a loading level indicator received from a neighboring wireless communication apparatus (e.g., neighboring base station, . . . ). Pursuant to a further example, the input can be an eigenvalue distribution of a covariance matrix. At 604, a value for a configurable parameter can be chosen as a function of the estimated noise correlation. Further, the configurable parameter can be included in a modified covariance matrix utilized to weight signals from multiple receive antennas. The values for the configurable parameter can be selected based upon a mapping specified by an equation, look-up table, etc.

It will be appreciated that, in accordance with one or more aspects described herein, inferences can be made regarding controlling a combination of MRC and interference nulling utilized for weighting signals from multiple receive antennas in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
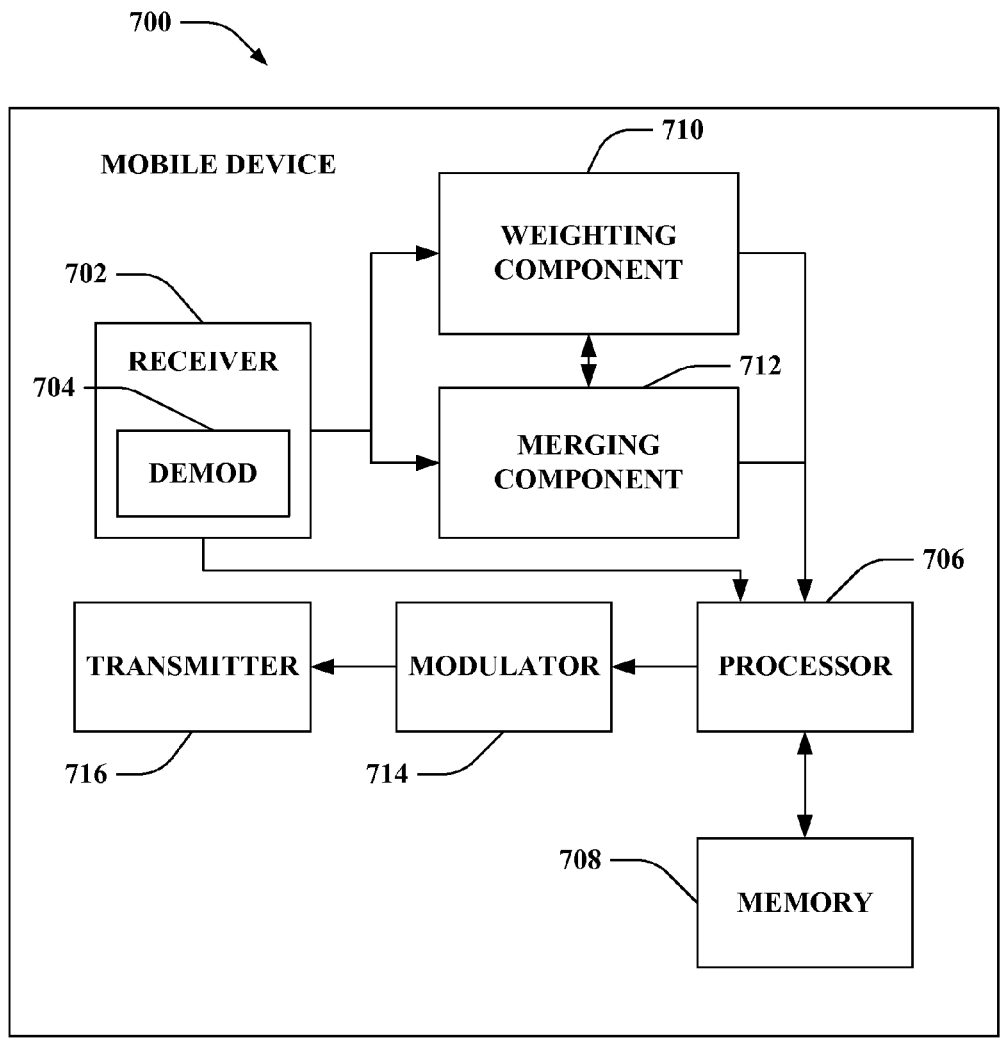
FIG. 7 is an illustration of an example mobile device that combines signals from multiple receive paths in a wireless communication system.

FIG. 7 is an illustration of a mobile device 700 that combines signals from multiple receive paths in a wireless communication system. Mobile device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, and any other suitable information related to performing the various actions and functions set forth herein. Memory 708, for instance, can store protocols and/or algorithms associated with weighting and/or merging signals from multiple receive paths as described herein. Further, memory 708 can store protocols and/or algorithms associated with controlling the weighting applied to the signals. Memory 708 can also include a look-up table that can be utilized to yield a value of a configurable parameter (e.g. tunable parameter, . . . ) (or respective values of configurable parameters) that can be leveraged for combining MRC operation and interference nulling operation.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can be operatively coupled to a weighting component 710 and/or a merging component 712. Weighting component 710 can be substantially similar to weighting component 206 of FIG. 2 and/or merging component 712 can be substantially similar to merging component 208 of FIG. 2. Further, although not shown, it is contemplated that receiver 702 can include weighting component 710 and/or merging component 712. Weighting component 710 can generate respective weights for signals from multiple receive antennas utilizing a combination of maximal ratio combining (MRC) and interference nulling. Moreover, the combination of MRC and interference nulling operation can be controlled based upon configurable parameter(s) (e.g., by weighting component 710, a combination component substantially similar to combination component 214 of FIG. 2, . . . ). The configurable parameter(s), for instance, can be selected based upon an estimate of noise correlation (e.g., yielded by weighting component 710, a correlation estimation component similar to correlation estimation component 302 of FIG. 3, . . . ). Moreover, merging component 712 can join the weighted signals yielded by weighting component 710. Mobile device 700 still further comprises a modulator 714 and a transmitter 716 that transmits data, signals, etc. to a base station. Although depicted as being separate from the processor 706, it is to be appreciated that weighting component 710, merging component 712 and/or modulator 714 can be part of processor 706 or a number of processors (not shown).

Figure 8:
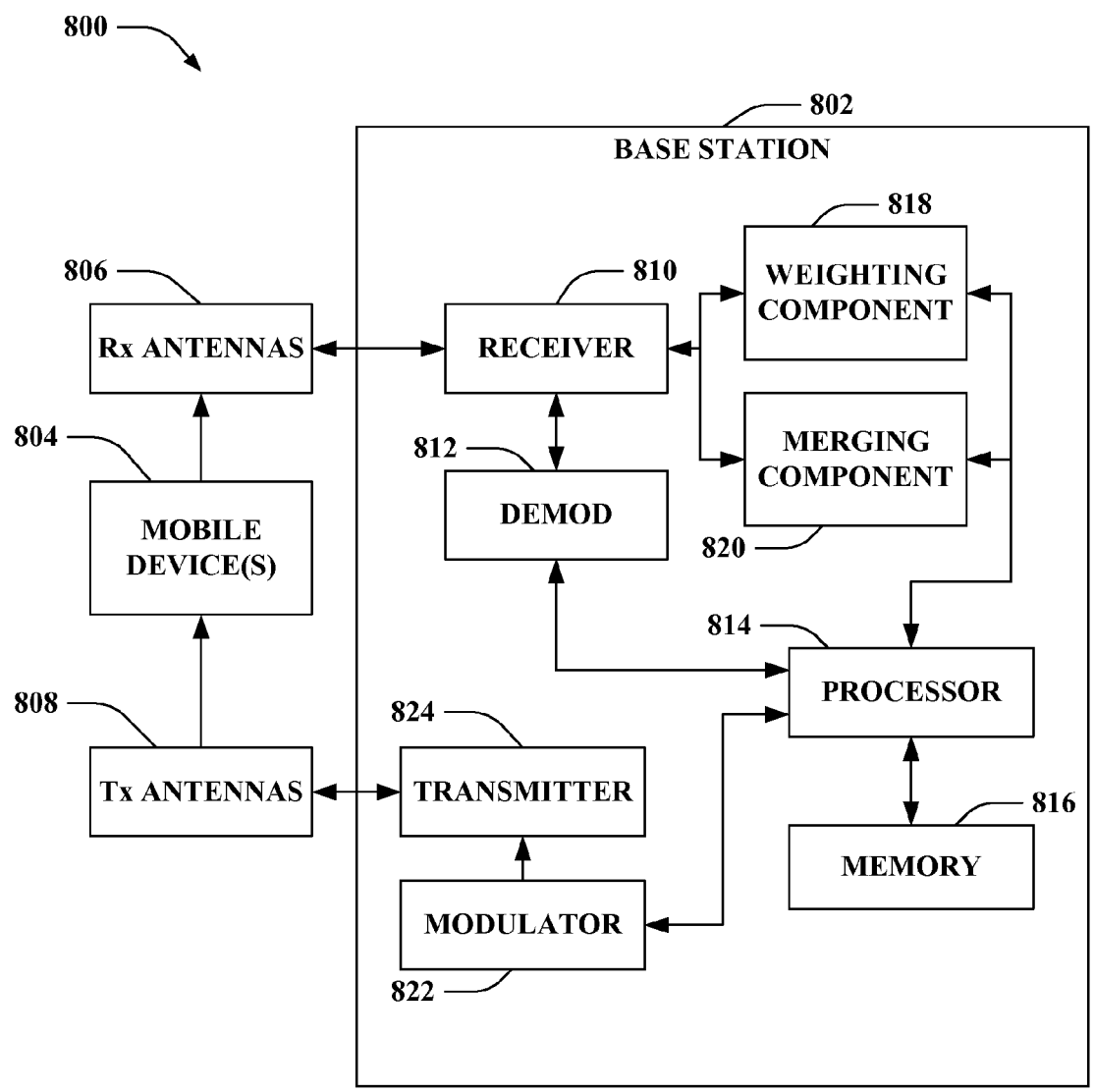
FIG. 8 is an illustration of an example system that merges signals obtained using a plurality of receive antennas in a wireless communication environment.

FIG. 8 is an illustration of a system 800 that merges signals obtained using a plurality of receive antennas in a wireless communication environment. System 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores data to be transmitted to or received from mobile device(s) 804 and/or any other suitable information related to performing the various actions and functions set forth herein. Processor 814 is further coupled to a weighting component 818 and/or a merging component 820. Weighting component 818 can be substantially similar to weighting component 206 of FIG. 2 and/or merging component 820 can be substantially similar to merging component 208 of FIG. 2. Weighting component 818 can leverage a combination of MRC and interference nulling to respectively weight signals obtained via receive antennas 806 as described herein. Further, merging component 820 can combine the weighted signals to yield an output signal. Moreover, although not shown, it is to be appreciated that base station 802 can further include a combination component (e.g., substantially similar to combination component 214 of FIG. 2, . . . ) and/or a correlation estimation component (e.g., substantially similar to correlation estimation component 302 of FIG. 3, . . . ). Base station 802 can further include a modulator 822. Modulator 822 can multiplex a frame for transmission by a transmitter 824 through antennas 808 to mobile device(s) 804 in accordance with the aforementioned description. Although depicted as being separate from the processor 814, it is to be appreciated that weighting component 818, merging component 820, and/or modulator 822 can be part of processor 814 or a number of processors (not shown).

Figure 9:
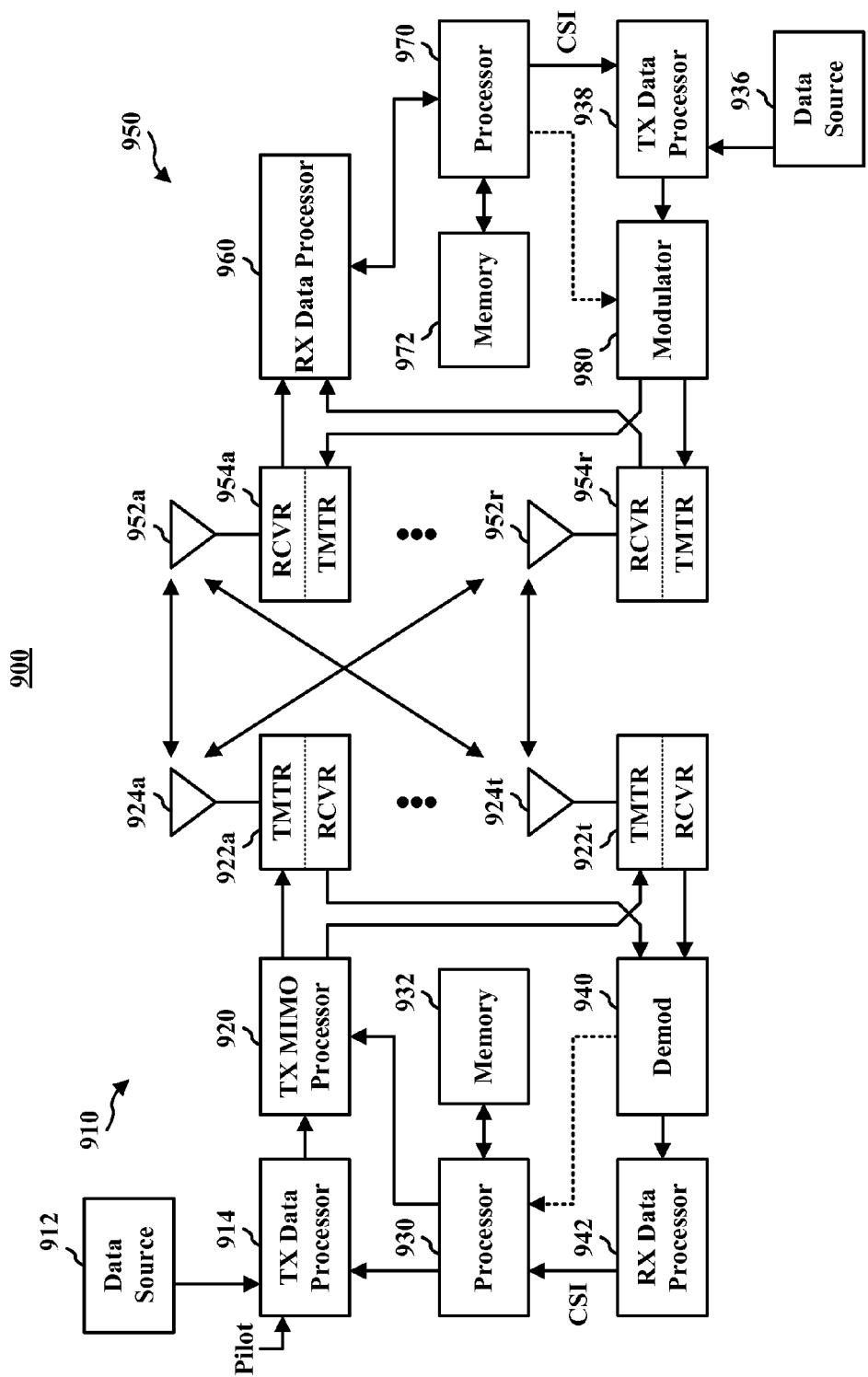
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3, 7-8 and 10) and/or methods (FIGS. 4-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which preceding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
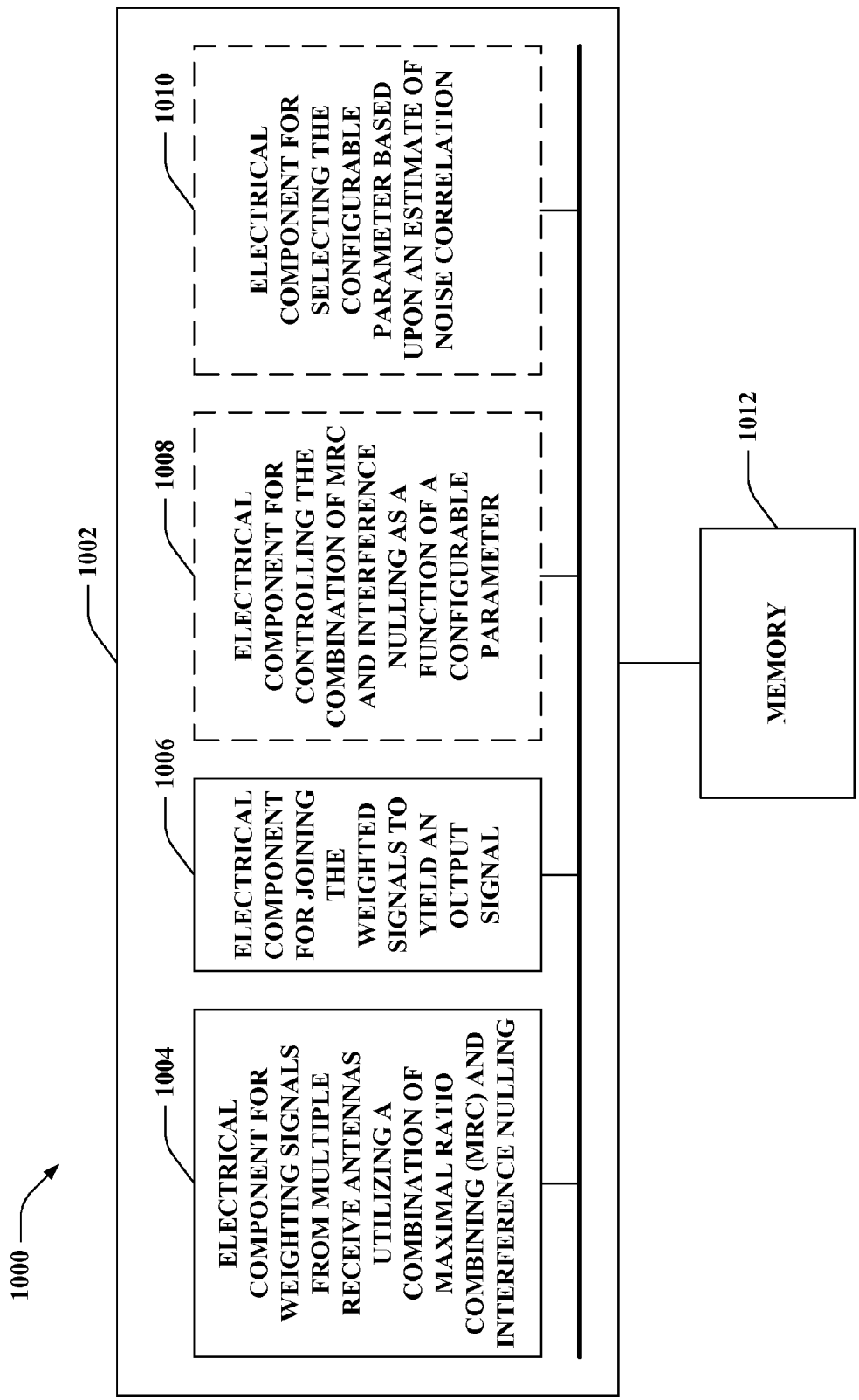
FIG. 10 is an illustration of an example system that enables adaptively combining signals from multiple receive antennas based upon a structure of interference in a wireless communication environment.

With reference to FIG. 10, illustrated is a system 1000 that enables adaptively combining signals from multiple receive antennas based upon a structure of interference in a wireless communication environment. For example, system 1000 can reside at least partially within a base station. According to another example, system 1000 can reside within a mobile device. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for weighting signals from multiple receive antennas utilizing a combination of maximal ratio combining (MRC) and interference nulling 1004. Moreover, logical grouping 1002 can include an electrical component for joining the weighted signals to yield an output signal 1006. Logical grouping 1002 can also optionally include an electrical component for controlling the combination of MRC and interference nulling as a function of a configurable parameter 1008. Additionally, logical grouping 1002 can optionally include an electrical component for selecting the configurable parameter based upon an estimate of noise correlation 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
    weighting signals from multiple receive antennas utilizing a combination of maximal ratio combining (MRC) and interference nulling;
    modifying a covariance matrix corresponding to interference to include at least one configurable parameter according to $s_{new}=(1-\lambda)s+\lambda d$, where s is an original value and represents eigenvalues of the covariance matrix when the covariance matrix is factorized into a diagonal form, $s_{new}$ is a modified value and represents eigenvalues of the modified covariance matrix when the modified covariance matrix is factorized into the diagonal form, $\lambda$ is the at least one configurable parameter, and d is a desired value for a variable and represents desired choices for the eigenvalues of s;
    selecting a value for the at least one configurable parameter,
    generating respective weights for each receive path utilizing the modified covariance matrix as a function of the value of the at least one configurable parameter for the interference nulling,
    applying the respective weights to corresponding signals from the multiple receive antennas; and
    merging the weighted signals to yield an output signal.

2. The method of claim 1, further comprising estimating the covariance matrix from pilots embedded within a received waveform.

3. The method of claim 1, wherein s represents entries of the covariance matrix, $s_{new}$ represents entries of the modified covariance matrix, and d represents entries of a diagonal matrix with a diagonal that matches a diagonal of the covariance matrix.

4. The method of claim 1, wherein the modified covariance matrix includes multiple configurable parameters, and each of the multiple configurable parameters is associated with a respective subset of variables to be modified.

5. The method of claim 1, further comprising:
    estimating noise correlation as a function of at least one input; and
    selecting the value for the at least one configurable parameter as a function of the estimated noise correlation.

6. The method of claim 5, wherein the at least one input includes one or more of a measured interference-over-thermal (IoT) value, a loading level indicator received from a neighboring wireless communication apparatus, or an eigenvalue distribution of the covariance matrix.

7. A wireless communications apparatus, comprising:
at least one processor configured to:
  weight signals from multiple receive antennas utilizing a combination of maximal ratio combining (MRC) and interference nulling;
  modify a covariance matrix corresponding to interference to include at least one configurable parameter according to $s_{new}=(1-\lambda)s+\lambda d$, where s is an original value and represents eigenvalues of the covariance matrix when the covariance matrix is factorized into a diagonal form, $s_{new}$ is a modified value and represents eigenvalues of the modified covariance matrix when the modified covariance matrix is factorized into the diagonal form, $\lambda$ is the at least one configurable parameter, and d is a desired value for a variable and represents desired choices for the eigenvalues of s;
  select a value for the at least one configurable parameter;
  generate respective weights for each receive path utilizing the modified covariance matrix as a function of the value of the at least one configurable parameter for the interference nulling;
  apply the respective weights to corresponding signals from the multiple receive antennas; and
  merge the weighted signals to yield an output signal.

8. The wireless communications apparatus of claim 7, wherein s represents entries of the covariance matrix, $s_{new}$ represents entries of the modified covariance matrix, and d represents entries of a diagonal matrix with a diagonal that matches a diagonal of the covariance matrix.

9. The wireless communications apparatus of claim 7, wherein the modified covariance matrix includes multiple configurable parameters, and each of the multiple configurable parameters is associated with a respective subset of variables to be modified.

10. The wireless communications apparatus of claim 7, further comprising:
at least one processor configured to:
  estimate noise correlation as a function of at least one input, the at least one input includes one or more of a measured interference-over-thermal (IoT) value, a loading level indicator received from a neighboring wireless communication apparatus, or an eigenvalue distribution of the covariance matrix; and
  select the value for the at least one configurable parameter as a function of the estimated noise correlation.

11. An apparatus, comprising:
means for weighting signals from multiple receive antennas utilizing a combination of maximal ratio combining (MRC) and interference nulling;
means for modifying a covariance matrix corresponding to interference to include at least one configurable parameter according to $s_{new}=(1-\lambda)s+\lambda d$, where s is an original value and represents eigenvalues of the covariance matrix when the covariance matrix is factorized into a diagonal form, $s_{new}$ is a modified value and represents eigenvalues of the modified covariance matrix when the modified covariance matrix is factorized into the diagonal form, $\lambda$ is the at least one configurable parameter, and d is a desired value for a variable and represents desired choices for the eigenvalues of s;
means for selecting a value for the at least one configurable parameter;
means for generating respective weights for each receive path utilizing the modified covariance matrix as a function of the value of the at least one configurable parameter for the interference nulling;
means for applying the respective weights to corresponding signals from the multiple receive antennas; and
means for joining the weighted signals to yield an output signal.

12. The apparatus of claim 11, further comprising means for controlling the combination of MRC and interference nulling as a function of the at least one configurable parameter.

13. The apparatus of claim 12, further comprising means for selecting the at least one configurable parameter based upon an estimate of noise correlation.

14. The apparatus of claim 13, wherein the noise correlation is estimated based upon one or more of a measured interference-over-thermal (IoT) value, a loading level indicator received from a neighboring wireless communication apparatus, or an eigenvalue distribution of a covariance matrix.

15. A computer program product, comprising:
a non-transitory computer-readable medium comprising:
  code for causing at least one computer to weight signals from multiple receive antennas utilizing a combination of maximal ratio combining (MRC) and interference nulling;
  code for causing the at least one computer to modify a covariance matrix corresponding to interference to include at least one configurable parameter according to $s_{new}=(1-\lambda d)s+\lambda d$, where s is an original value and represents eigenvalues of the covariance matrix when the covariance matrix is factorized into a diagonal form, $s_{new}$ is a modified value and represents eigenvalues of the modified covariance matrix when the modified covariance matrix is factorized into the diagonal form, $\lambda$ is the at least one configurable parameter, and d is a desired value for a variable and represents desired choices for the eigenvalues of s;
  code for causing the at least one computer to select a value for the at least one configurable parameter;
  code for causing the at least one computer to generate respective weights for each receive path utilizing the modified covariance matrix as a function of the value of the at least one configurable parameter for the interference nulling;
  code for causing the at least one computer to apply the respective weights to corresponding signals from the multiple receive antennas; and
  code for causing the at least one computer to merge the weighted signals to yield an output signal.

16. The computer program product of claim 15, wherein the computer-readable medium further comprises:
  code for causing the at least one computer to estimate a covariance matrix corresponding to interference from pilots embedded within a received waveform;
  code for causing the at least one computer to modify the covariance matrix to include two or more configurable parameters; and
  code for causing the at least one computer to choose a respective value for each of the configurable parameters.

17. The computer program product of claim 15, wherein s represents entries of the covariance matrix, $s_{new}$ represents entries of the modified covariance matrix, and d represents entries of a diagonal matrix with a diagonal that matches a diagonal of the covariance matrix.

18. The computer program product of claim 16, wherein the computer-readable medium further comprises:
  code for causing the at least one computer to estimate noise correlation as a function of at least one input, wherein the at least one input includes one or more of a measured interference-over-thermal (IoT) value, a loading level indicator received from a neighboring wireless communication apparatus, or an eigenvalue distribution of the covariance matrix; and code for causing the at least one computer to select the respective value for each of the configurable parameters as a function of the estimated noise correlation.

19. An apparatus, comprising:

a weighting component configured to:

generate respective weights for signals obtained via multiple receive antennas, modify a covariance matrix corresponding to interference to include at least one configurable parameter according to $s_{new}=(1-\lambda)s+\lambda d$, where s is an original value and represents eigenvalues of the covariance matrix when the covariance matrix is factorized into a diagonal form, $s_{new}$ is a modified value and represents eigenvalues of the modified covariance matrix when the modified covariance matrix is factorized into the diagonal form, $\lambda$ is the at least one configurable parameter, and d is a desired value for a variable and represents desired choices for the eigenvalues of s, select a value for the at least one configurable parameter, generate respective weights for each receive path utilizing the modified covariance matrix as a function of the value of the at least one configurable parameter for the interference nulling, and apply the respective weights to corresponding signals from the multiple receive antennas, the weighting component leverages a combination of maximal ratio combining (MRC) and interference nulling; and a merging component that yields an output signal via summing the weighted signals.

20. The apparatus of claim 19, further comprising a combination component that controls the combination of MRC and interference nulling to adapt to a structure of interference on a channel based upon at least one parameter.

* * * * *